(No Model.) 2 Sheets—Sheet 1.

A. W. TOURGEE & L. DE F. JENNINGS.
VEHICLE POLE AND SHAFTS.

No. 333,979. Patented Jan. 5, 1886.

Witnesses:
Harry S. Power.
J. N. Adriaans.

Inventors:
Albion W. Tourgee & L. de F. Jennings
By Parker H. Sweet Jr.
Atty.

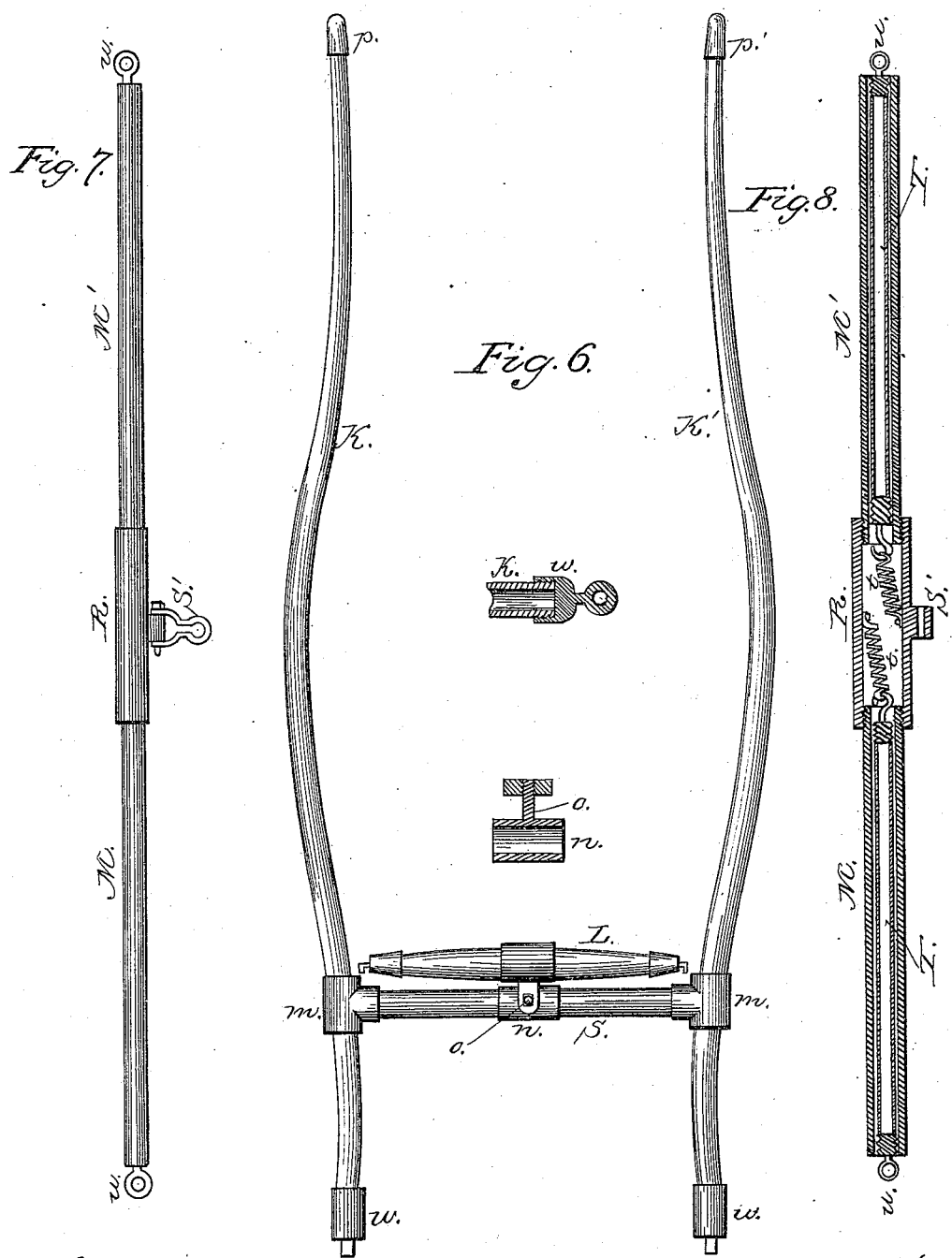

UNITED STATES PATENT OFFICE.

ALBION W. TOURGEE AND LINSON DE F. JENNINGS, OF MAYVILLE, NEW YORK, ASSIGNORS TO SAID JENNINGS AND S. E. KILBOURN, OF SAME PLACE, AND A. C. KILBOURN, OF ERIE, PENNSYLVANIA.

VEHICLE POLE AND SHAFT.

SPECIFICATION forming part of Letters Patent No. 333,979, dated January 5, 1886.

Application filed May 19, 1885. Serial No. 166,028. (No model.)

*To all whom it may concern:*

Be it known that we, ALBION W. TOURGEE and LINSON DE F. JENNINGS, of Mayville, in the county of Chautauqua and State of New York, have invented certain new and useful Improvements in Vehicle Poles and Shafts; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention has for its object to provide certain new and useful improvements in the construction of vehicle shafts and poles, whereby the greatest degree of strength, lightness, and utility are combined, the readiness of adjustability and interchangeability of parts secured, and the ease of repair and general efficiency of action promoted in the simplest and best possible manner; and our improvements consist, essentially, in constructing the various parts of the shafts or pole from drawn-steel tubes or of sheet-steel metal struck up into the required form, connecting the different parts by threaded steel couplings, and providing the attaching ends with threaded steel caps having suitable hooks or lugs, all as will be hereinafter fully described, and specifically designated in the claims.

Figure 1:
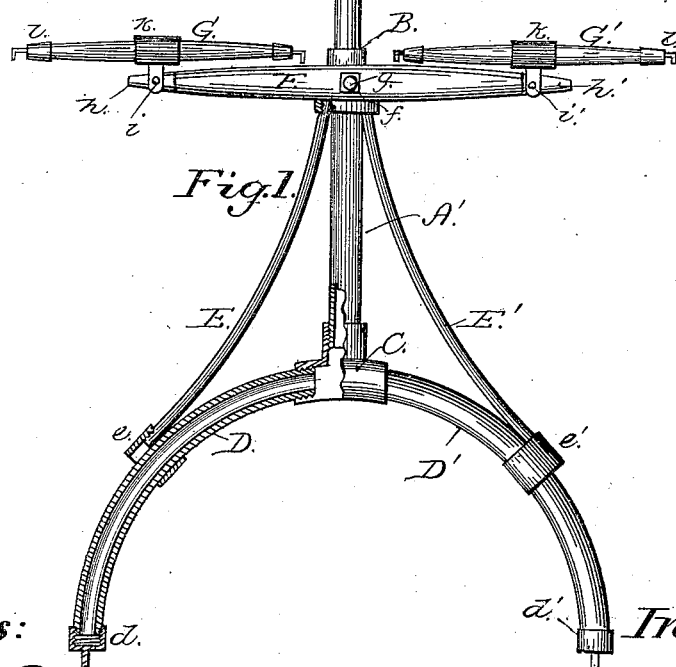

In the accompanying drawings, Figure 1 represents a top plan view of a vehicle-pole, in partial section, constructed according to our invention; Figs. 2 to 5, enlarged detail views thereof; Fig. 6, a plan view of vehicle-shafts in partial section; Fig. 7, a plan view of a neck-yoke, and Fig. 8 a sectional view of the same.

Similar letters of reference occurring on the several figures indicate like parts.

In carrying out our improvements the pole proper is formed of two parts or sections, A A', each of which is threaded at both ends and connected together by the threaded central steel coupling, B, as shown. The front part or section, A, of the pole is provided with a slot $a$, which is adapted to receive the spring-catch $b$, which is retained in place by the threaded tubular steel cap $c$, which fits upon the front end of the pole, as shown. The rear part or section, A', of the pole engages with the threaded T-shaped steel coupling C, to which are likewise secured the front ends of the two parts or sections D D', forming the cross-bar, the rear ends of the same being also threaded to receive the threaded steel caps $d\ d'$, having lugs or cross-heads formed solid therewith for engagement and attachment with the shaft or pole-clips upon the vehicle-axle.

E E' represent the semicircular pole-braces, which are composed of sheet-steel struck up into the desired form, each being preferably the one-half of a cylindrical steel tube to fit the curved surfaces of the pole A' and the sections D D' of the cross-bar, said braces being threaded at each end for engagement with the central coupling, B, at their forward ends and at the rear with the threaded collar-couplings $e\ e'$, by which they are firmly attached to the sections D D' of the cross-arms.

F represents the double-tree, which is composed of tubular steel, rounded or oval, and provided with a central opening, $f$, for pivotal connection with the bolt $g$, which is formed solid with the central coupling, B, the ends of said double-tree being threaded to receive the steel screw-caps $h\ h'$, which are provided with bolts $i\ i'$ or other suitable attaching devices for connecting the whiffletrees G G' thereto. These whiffletrees G G' each consist, preferably, of two sections of tubular steel, drawn or struck into the required shape, and threaded at each end to engage with the central coupling, $k$, at their inner ends, and with the screw-caps $l$ at their outer ends. Upon the central coupling, $k$, is forged or otherwise suitably attached a lug designed to couple with the bolts $i$ upon the screw-caps of the double-tree, while upon the screw-caps $l$ are forged hooks, buttons, or other suitable devices for the attachment of the traces of the harness.

Figure 2:
Figure 4:
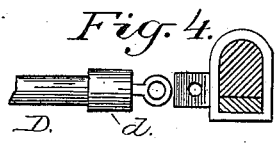
Figure 3:
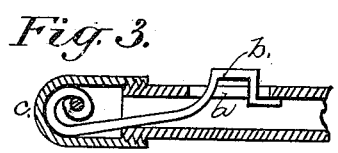
Figure 5:

The parts or sections A A' of the pole, as also the cross-bar, double-tree, and whiffletrees are preferably composed of drawn tubular steel struck up into an oval form in cross-section, as shown in Fig. 5, although the same may be made round or of other suitable shape if deemed desirable or advantageous. In like manner the shafts K K' may be constructed of drawn tubular steel or sheet-steel, struck up into tubular form, with the cross-piece S, also formed of drawn tubular steel or sheet-steel struck up into the proper rounded or oval form, and connected with the shafts by the T-shaped couplings m, as shown. The cross-piece S is provided with the central coupling, n, having a bolt, o, forged thereon for pivotally connecting the whiffletree L thereto in the manner heretofore described. Suitable screw-caps, p p', are adapted to fit upon the front ends of the shafts, while similar screw-caps, w, having suitable attaching devices, are adapted to fit the rear ends of the shafts for securing them to the vehicle-axle. The neck-yoke (shown in Fig. 7) is also formed of two tubular steel sections, M M', united together by the central screw-coupling, R, having a depending lug to which is hinged a jointed ring, S', designed to fit over the end of the pole A, and be held thereon by the spring-catch shown in Fig. 1. At the outer ends of the sections M M' are provided suitable lugs or rings, u, for connection with the harness. In Fig. 8 is shown a modified construction of said neck-yoke, whereby the same is made of an extensible character, and to which end I provide an inner or telescopic tube, T, fitting within each of the tubular sections M M', as shown, the inner ends of said tubes T being connected by the springs t to the central part of the interior of the coupling R, while the outer ends are provided with the lugs or rings u, as shown.

Having thus described our invention, we claim as new and useful—

1. A carriage-pole formed, as described, of tubular or sheet steel struck up into oval form, and consisting of the two parts A A', connected to the cross-bar D D' by the T-shaped coupling C and braces E E', and provided with the double-tree F, whiffletrees G G', screw-caps d d', having suitable attaching devices, and the screw-cap c, and spring-catch b, all substantially as shown, and for the purpose specified.

2. In a carriage-pole, the braces E E', formed of oval sheet-steel, as described, and adapted to fit the curve of the pole, and the cross-bar connecting with the pole by the screw-coupling B, and with the cross-bar D D' by the collar-couplings e e', substantially as and for the purpose specified.

In testimony that we claim the foregoing as our own we affix our signatures in the presence of two witnesses.

ALBION W. TOURGEE.
LINSON DE F. JENNINGS.

Witnesses:
S. E. KILBOURN,
EMMA K. TOURGEE.